(12) United States Patent
Kellermeier

(10) Patent No.: US 7,124,490 B2
(45) Date of Patent: Oct. 24, 2006

(54) JOINING OF TWO COMPONENTS IN A HOT FORMING PROCESS

(75) Inventor: Rainer Kellermeier, Paderborn (DE)

(73) Assignee: Benteler Automobil Technik GmbH, Paderborn (DE)

( * ) Notice: Subject to any disclaimer, the term of this patent is extended or adjusted under 35 U.S.C. 154(b) by 0 days.

(21) Appl. No.: 10/957,421

(22) Filed: Oct. 1, 2004

(65) Prior Publication Data

US 2005/0132555 A1    Jun. 23, 2005

(30) Foreign Application Priority Data

Oct. 9, 2003    (DE) ................ 103 46 906

(51) Int. Cl.
*B23P 11/00* (2006.01)
*B23P 11/02* (2006.01)
*F16B 4/00* (2006.01)

(52) U.S. Cl. .............. 29/432.2; 29/447; 29/897.2; 403/273

(58) Field of Classification Search ........... 29/432.2, 29/447; 403/273; 285/381.1
See application file for complete search history.

(56) References Cited

U.S. PATENT DOCUMENTS 1,388,657 A * 8/1921 MacDonald et al. ....... 285/222
1,854,211 A * 4/1932 Meuer ..................... 200/457
4,810,143 A * 3/1989 Muller ..................... 411/181

FOREIGN PATENT DOCUMENTS

| DE | 24 52 486 | 5/1975 |
| DE | 78 37 855 | 11/1980 |
| DE | 195 08 632 | 9/1996 |
| EP | 0 593 950 | 4/1994 |

OTHER PUBLICATIONS

Kutz, Myer. Mechanical Engineers' Handbook. Copyright 1986 by Joyhn Wiley $ Sons, Inc.*

* cited by examiner

*Primary Examiner*—David P. Bryant
*Assistant Examiner*—Douglas E. Mazzuca, Jr.
(74) *Attorney, Agent, or Firm*—Andrew Wilford

(57) ABSTRACT

A bushing can be anchored in a sheet steel blank for a cross beam for a vehicle chassis by inserting the bushing into a hole precisely provided in the steel blank, hot forming the steel blank in a die and hardening the hot formed shape steel body in the die. The cooling of the hardening step shrinks the sheet steel into a groove formed in the circumference of the bushing.

8 Claims, 6 Drawing Sheets

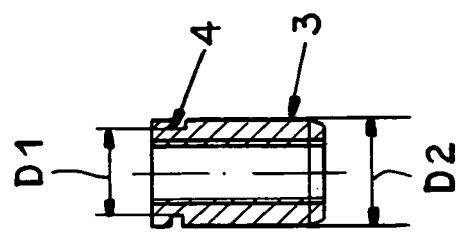
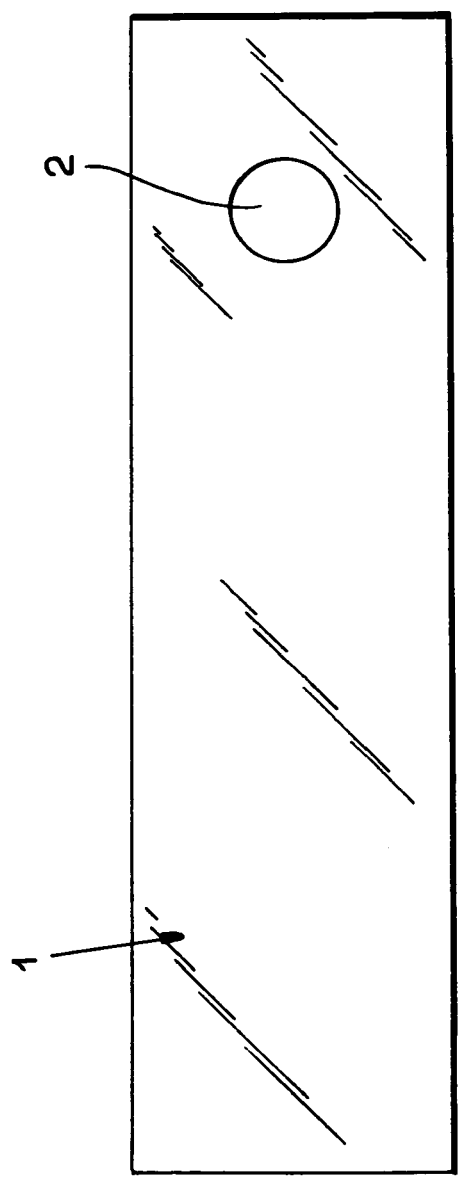
FIG.2
FIG.1

JOINING OF TWO COMPONENTS IN A HOT FORMING PROCESS

FIELD OF THE INVENTION

My present invention relates to a method of producing a hardened shaped steel body to which another metal member is connected and, more particularly, to the joining of the two members in the course of hot forming of a sheet steel blank to produce a shaped steel body.

BACKGROUND OF THE INVENTION

In the hot forming of sheet steel blanks to produce a shaped body, for example, a cross beam for a shock absorber system or some other part of a motor vehicle, the method can involve the techniques described for example in German Patent DE 24 52 486 C2. In this system, a press forming of the sheet steel blank in a die and in-the-die hardening of the shaped steel body is described for workpieces of boron-alloyed steel. The steel blank is heated to a temperature above the $AC_3$ temperature, namely the temperature at which in the alloy steel the conversion of ferrite to austenite is complete, and then is held in the die for cooling over a period of less than five seconds for hardening. The rapid cooling in the layer shaping die, by indirect cooling, e.g. water cooling of the upper and lower die members of the forming press, results in a martensidic or bainitic fine grain structure. The result can be a product of small thickness of the material from which the shaped steel body is formed, high dimensional stability and high strength.

While the aforedescribed method has been found to be successful in practice, there are many parts of a vehicle where energy-absorbing members are used in the chassis and in parts of the vehicle connected to the chassis that require not only the high strength and good yielding characteristics or ductility, that this method can afford but also the high shape stability and the capacity to use the technique for mass production.

However, in the past these hot formed and tool-hardened components frequently had to be joined to other members. In the case of metal members, this generally required a weld or screw connection. Both of these joining techniques required separate steps in the manufacturing process to effect the joining. In addition, the heat applied by welding could result in dimensional variations, loss of hardness and other drawbacks. In fact, both attachment techniques frequently resulted in a weakening of the zone at which the attachment occurs. A drawback of the screw connection is that the screws themselves create locations at which there can be water penetration, rust formation and loss of strength. Both the welding technique and the screw connection technique had negative affects of the reliability and durability of the assembly.

OBJECTS OF THE INVENTION

It is the principal object of the present invention to provide a method of making a shaped steel body and connecting another metal member thereto whereby the drawbacks outlined above can be avoided and the fabrication process simplified.

Another object is to obviate drawbacks of earlier systems for making shaped steel bodies by hot pressing and in-tool hardening.

SUMMARY OF THE INVENTION

These objects and others which will become apparent hereinafter are attained, in accordance with the invention by a method of making a shaped steel or plate steel body having at least one other metal member attached thereto which comprises the steps of:

(a) heating a steel blank to a temperature in excess of the $A_{C3}$ temperature of the steel of said blank to form a heated steel blank;

(b) positioning the heated steel blank in a shaping die;

c) inserting the other metal member in a cold state in the heated steel blank at a defined position in the shaping die;

(d) forming the heated steel blank with the metal member therein into the shaped steel body in the shaping die and at least partly enclosing the metal member in the shaped steel body; and (e) rapidly cooling the shaped steel body as formed in step (d) to harden same in the die or tool and simultaneously anchor the metal member in the shaped steel body by shrinkage thereof against the metal member utilizing the coefficient of thermal expansion of the body.

Since the metal member to be connected to the heated blank is inserted into a die in a defined position and the deformation then effected so that the metal member is at least partly secured in the body as it is being shaped, there is no or only minimal deformation or shaping of the metal member and only a single set of fabrication operations are required.

Utilizing the coefficients of thermal expansion, the shaped body is shrunk onto the metal member during the hardening process in the tool or die. During this shrinking process, the two members are connected without requiring a screw connection or welding, eliminating the expensive separate connection step which has heretofore been required.

The result is a significant reduction in cost and elimination of the corrosion problem which can arise with the screw connection or even point MIG or MAG welding (the temperature of cracking and associated corrosion). The embrittlement which can result in a partial martensite formation in the welding zone with the danger of crack formation and stress crack corrosion and with chemical reactions between the metallic materials and the environment, are eliminated. The shrink anchoring technique insures a uniform junction between the parts such that the junction remains corrosion resistant. After the hardening there is no distortion and no reduction in strength as a result of the connection. Instead, the strength distribution over the entire shaped steel body remains intact.

Preferably, the shaped sheet steel body is provided prior to the joining process at a defined position with a hole. The hole in the blank is at a location at which the other metal member is fitted into the shaped steel body and at a location corresponding to the position of that die member in the die or forming tool. The hole serves to accommodate the metal member to be connected to the shaped steel body. The precise formation of the hole allows the entire joining process to be a high precision one and optimally controlled.

According to a further feature of the invention, the metal member to be joined to the shaped steel body is provided with the circumferential groove into which during the forming process the sheet steel workpiece can be formed. The groove serves not only for anchoring the metal member to the shaped steel body in a form fitting manner but also enables the shaped steel body to shrink into the groove and form the precise junction therewith.

The hole can have a larger diameter than the outer diameter of the metal member and, according to the invention, the metal member is inserted into the hole so that the groove lies at the level of the hole. The forming step (hot pressing) and the subsequent shrinkage thereby insures that the metal member will be properly positioned. The positioning of the metal member in the die and the insertion of the metal blank into the die can be automated through the use of a handling system, such as an industrial robot. The use of an industrial robot has been found to be more accurate than the use of a person or manual manipulation. The positioning of the blank, the metal member and the pressing and cooling can all be programmed.

BRIEF DESCRIPTION OF THE DRAWING

The above and other objects, features, and advantages will become more readily apparent from the following description, reference being made to the accompanying drawing in which:

FIG. 1 is a plan view of a sheet steel blank prior to heating and after formation of a hole to receive the metal member;

FIG. 2 is a cross sectional view of a bushing for a shock absorber of an automotive vehicle adapted to be mounted in the shape steel body to be formed from the blank of FIG. 1;

SPECIFIC DESCRIPTION

Figure 3:
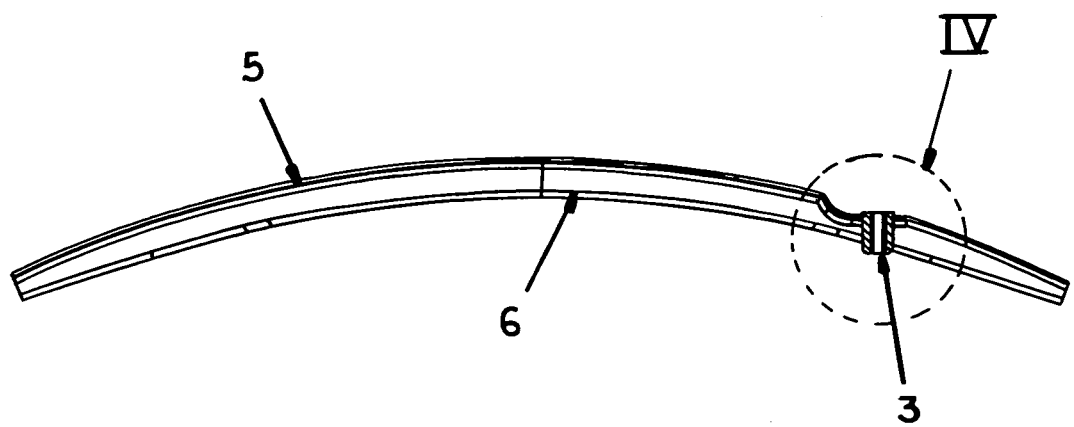
FIG. 3 is a cross sectional view showing the shaped steel body in the form of a cross beam of a motor vehicle chassis to which the shock absorber is to be connected and showing the bushing in place.

In FIG. 1 I have shown a sheet steel blank 1, preferably a boron alloy steel, which has previously been formed with a hole 2 of a diameter slightly greater than the outer diameter D2 of a bushing 3 to be anchored in the shaped steel body into which the blank is to be formed. The hole 2 is at a defined position in the blank 1, precisely determined by the ultimate location of the bushing 3 in the finished cross beam (FIG. 3).

FIG. 2 shows that the bushing 3 is formed with a circumferential groove 4 which has a root diameter D1. The width of this groove 4 corresponds approximately to the thickness of the sheet steel blank. The shaped steel body has been shown at 5 in FIG. 3 and has the configuration of a cross beam 6 for the chassis which has been provided with a bushing 3 for the shock absorber. The cross beam 6 has been shaped from the blank 1, hardened and joined to the bushing 3 by shrinkage of the sheet steel into the groove 4.

Figure 5:
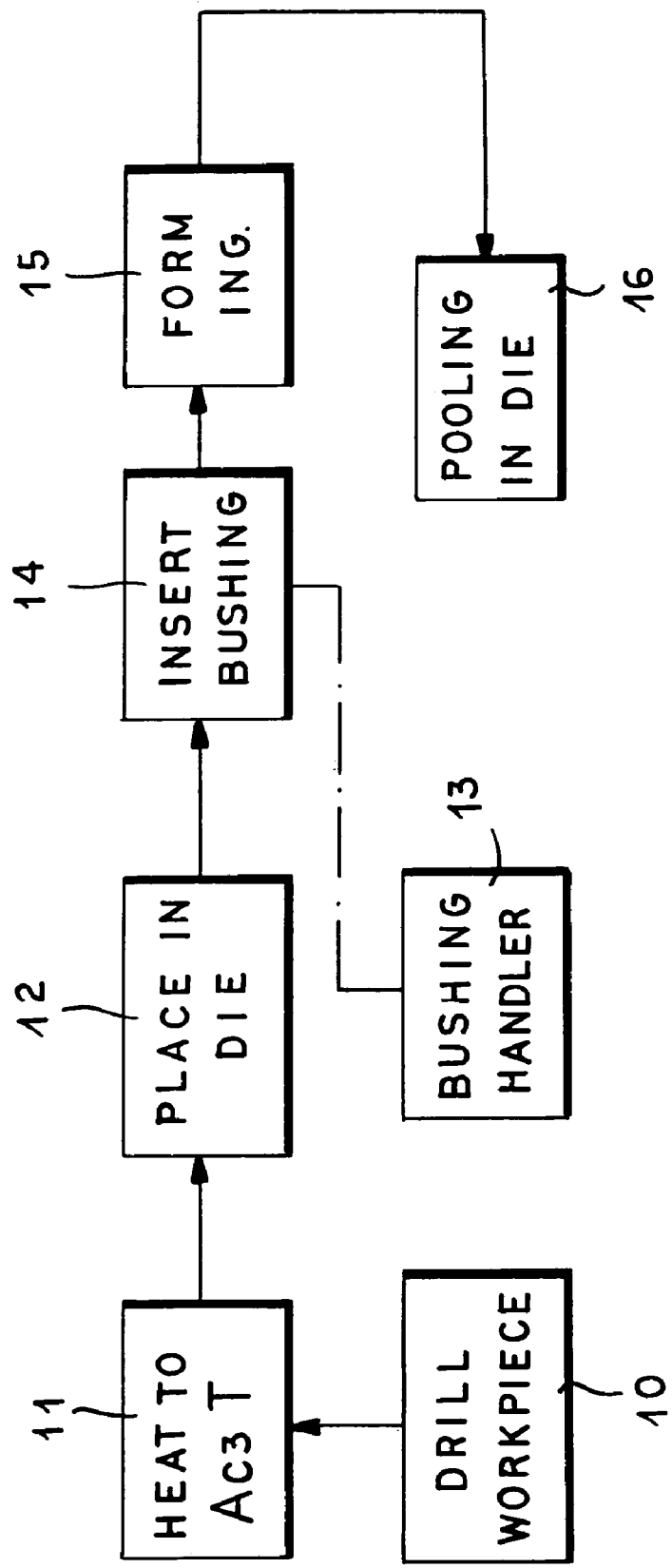
FIG. 5 is a block diagram of the method of the invention.

As is outlined in FIG. 5, the blank is heated to the AC3 temperature at 11. At that point, the blank is placed in the die at 12. Utilizing a bushing handler in the form of an industrial robot 13, the bushing is inserted in the die to the proper level in the bushing insertion step 14. The press is then closed under pressure to shape the cross beam 6 in the forming step 15 and force the bushing to insert in the blank while the press is closed, i.e. the cross beam 6 remains in the die or tool, the tool is rapidly cooled by circulating coolant through it to effect an in-tool hardening at 16.

Figure 4:
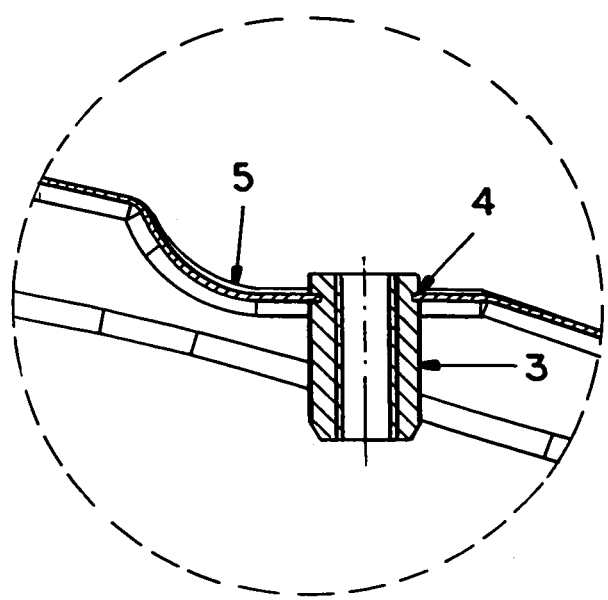
FIG. 4 is a detail view of the region IV or FIG. 3.

FIG. 4 shows the sheet steel blank after it has been shaped and shrunk into the groove 4 to form a fixed anchorage for the bushing in the cross beam.

Figure 6:
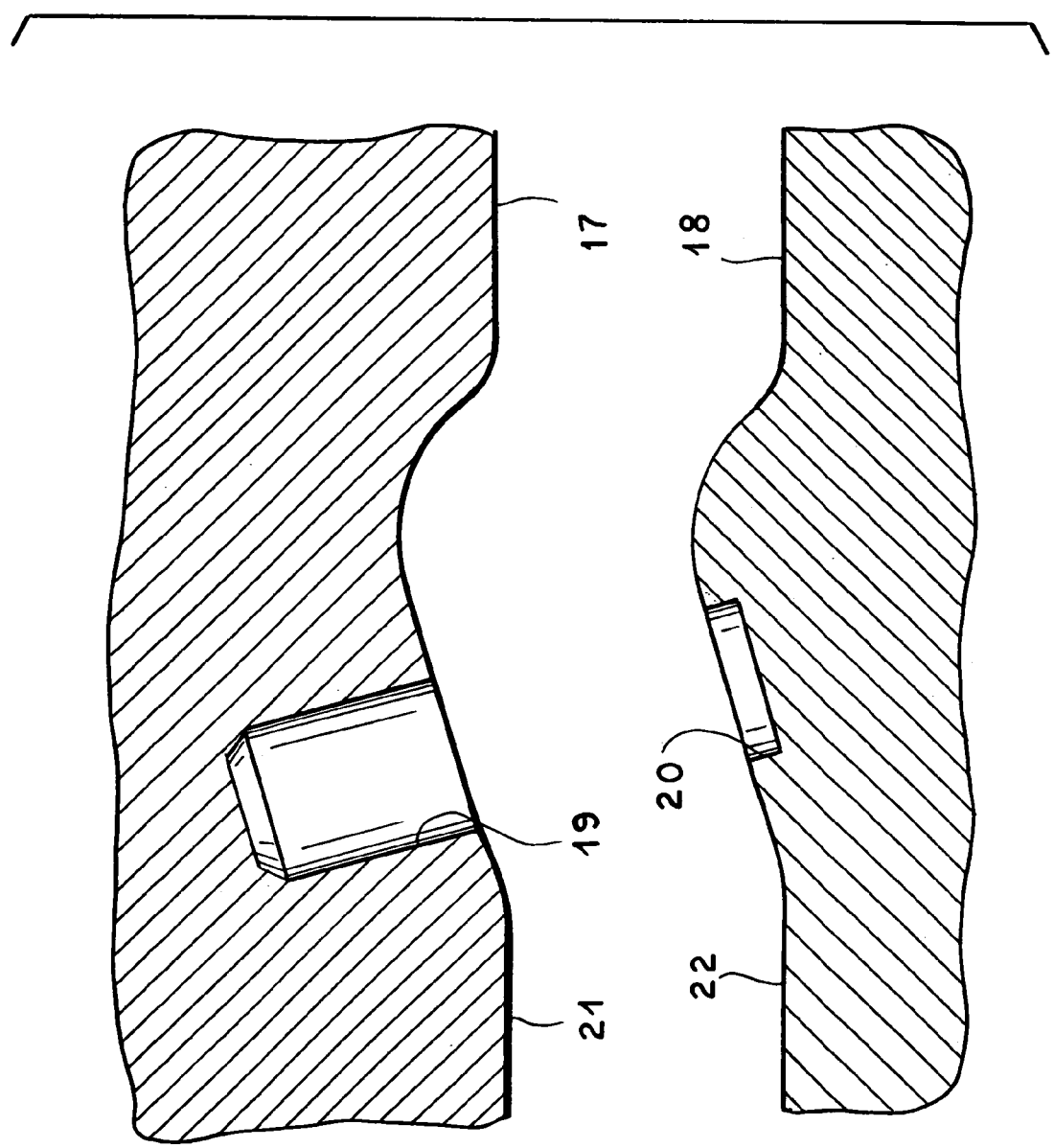
FIG. 6 is an illustration of the die without the coolant channels and in an open position.
Figure 7:
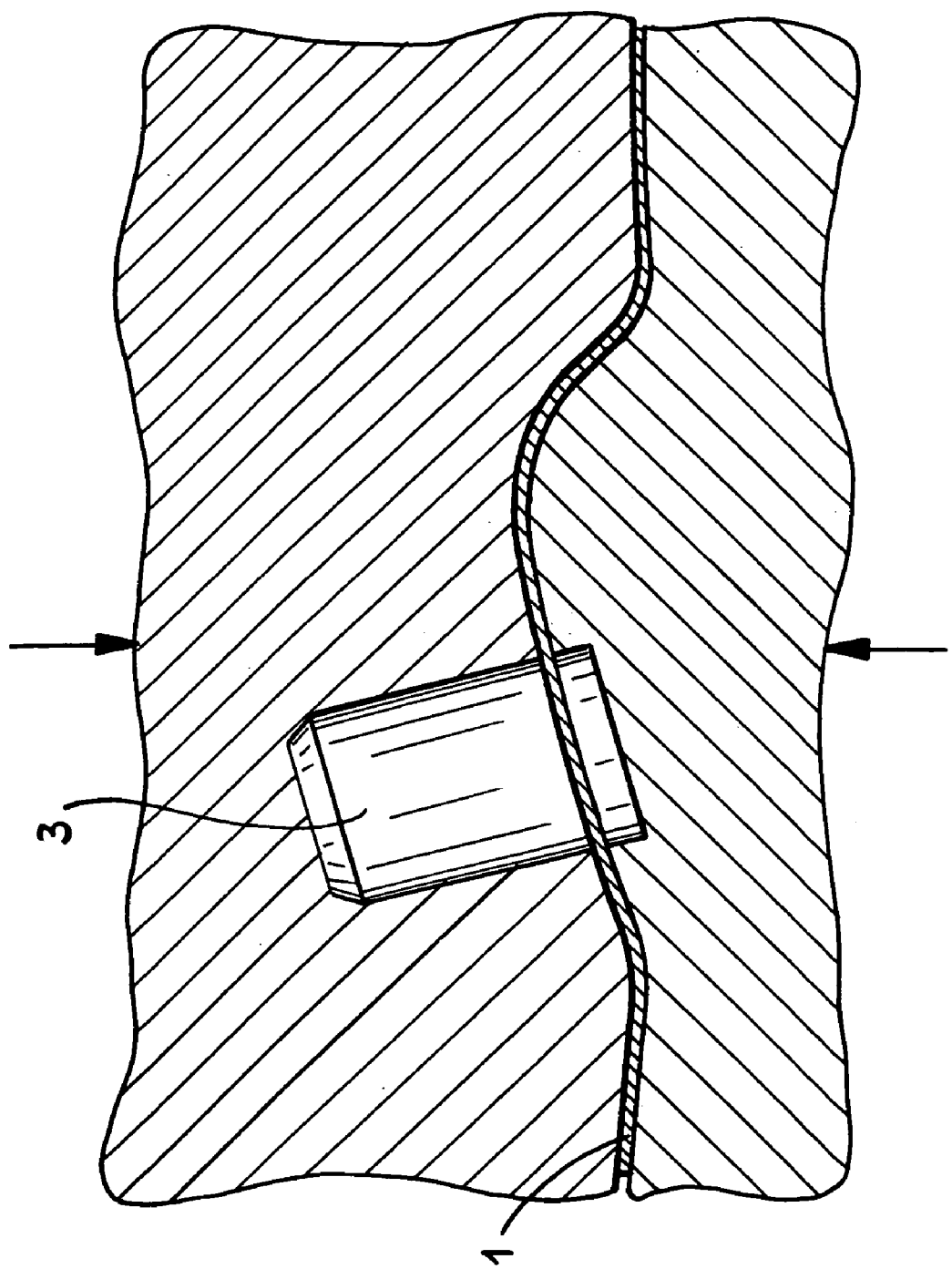
FIG. 7 is a cross sectional view through the closed die with the workpiece in place.

In FIG. 6, I have shown the two die halves 17 and 18 between which the workpiece is to be shaped, with recesses 19 and 20 for the member 3 and appropriate contours 21 and 22 for the shaping of the cross beam. The closed press is shown in FIG. 7 after the bushing 3 and the blank 1 have been inserted and pressure applied for the hot forming. The hardening and cooling take place while the workpiece is in the tool, e.g. by water cooling of the die.

Figure 9:
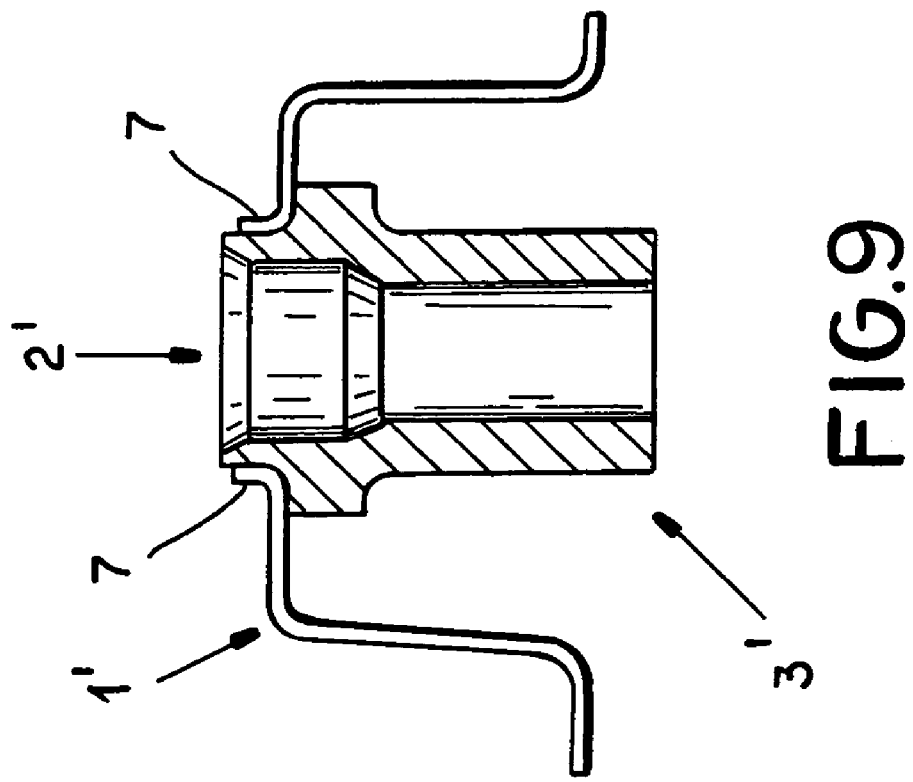
FIGS. 8 and 9 are cross sectional views showing the piercing of the blank by the sleeve or bushing in one application of the method.
Figure 8:
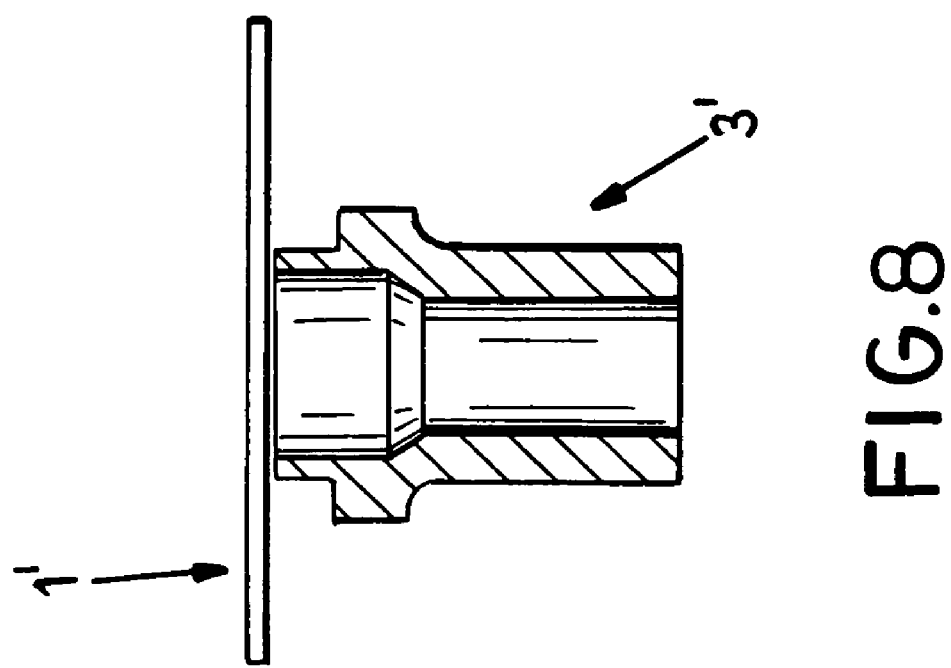

FIGS. 8 and 9 show a preferred embodiment of the invention in which the metal member, i.e. the bushing or sleeve 3' pierces the hole 2' in the blank or shaped body 1' during the forming operation. The member 1', likewise to be shaped into a shock absorber cross beam, does not have an opening to receive the bushing 3' before the forming process (see FIG. 8). After the blank 1' is placed in the die in a heated state, the bushing or sleeve 3' is juxtaposed with it (FIG. 8) and in the forming operation within the die, is driven through the blank 1' to form the hole 2' into which the member 3' fits. The edge 7 of the hole forms a kind of collar which hugs the member 3' and in the hardening and cooling process is shrunk around the periphery of the sleeve or bushing 3' to connect it to the shaped and hardened body.

The invention claimed is:

1. A method of making a shaped steel body having at least one other metal member attached thereto, the method comprising the steps of sequentially:
    a) heating a steel blank to a temperature in excess of the $AC_3$ temperature of the steel of said blank to form a heated steel blank;
    b) positioning the heated steel blank in a shaping die;
    c) inserting said other metal member in a cold state in said heated steel blank at a defined position in said shaping die;
    d) closing the die on the blank and on the member and thereby forming the heated steel blank with the metal member therein into said shaped steel body and simultaneously at least partly enclosing said metal member in said shaped steel body; and
    e) rapidly cooling said shaped steel body formed in step (d) while still in the die to harden same and simultaneously anchor said metal member in said shaped steel body by shrinkage thereof against said metal member utilizing the coefficient of thermal expansion of said body.

2. The method defined in claim 1 wherein said blank is formed, prior to step (a) with a hole receiving said metal member.

3. The method defined in claim 2 wherein said metal member is a cylindrical bushing, said method further comprising forming said bushing with a circumferential groove, said shaped steel body being shrunk into said groove in step (e).

4. The method defined in claim 3 wherein said hole has a greater diameter in a heated state of said blank than the outer diameter of said bushing, said bushing is inserted into said hole in step (c) to a level of the groove in said bushing, and the diameter of the hole is reduced during hardening in step (e).

5. The method defined in claim 4 wherein said bushing is inserted into said die by a bushing handling system.

6. The method defined in claim 5 wherein said bushing handling system is a robot.

7. The method defined in claim 6 wherein said body is a crossbeam of a shock absorber.

8. The method defined in claim 1 wherein the blank is formed with a hole receiving said member by driving said member into and through said blank in step (d).

* * * * *